(12) United States Patent
Lee et al.

(10) Patent No.: US 11,646,899 B2
(45) Date of Patent: May 9, 2023

(54) CIRCUIT FOR PHYSICALLY UNCLONABLE FUNCTION AND A METHOD TO GENERATE PRIVATE KEY FOR SECURE AUTHENTICATION USING A PHYSICALLY UNCLONABLE FUNCTION CELL

(71) Applicant: RESEARCH & BUSINESS FOUNDATION SUNGKYUNKWAN UNIVERSITY, Suwon-si (KR)

(72) Inventors: Yoon Myung Lee, Suwon-si (KR); Jong Min Lee, Suwon-si (KR); Min Sun Kim, Suwon-si (KR); Gi Cheol Shin, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 298 days.

(21) Appl. No.: 17/021,327

(22) Filed: Sep. 15, 2020

(65) Prior Publication Data
US 2021/0083886 A1    Mar. 18, 2021

(30) Foreign Application Priority Data
Sep. 16, 2019    (KR) .......................... 10-2019-0113761

(51) Int. Cl.
*H04L 9/32* (2006.01)
*H03K 19/003* (2006.01)
*H03K 19/17768* (2020.01)
*G06F 7/58* (2006.01)

(52) U.S. Cl.
CPC ..... *H04L 9/3278* (2013.01); *H03K 19/00346* (2013.01); *H03K 19/17768* (2013.01); *G06F 7/588* (2013.01); *H04L 2209/12* (2013.01)

(58) Field of Classification Search
CPC ... H04L 9/3278; H04L 2209/12; G06F 7/588; G06F 21/72
See application file for complete search history.

(56) References Cited

U.S. PATENT DOCUMENTS

| | | | | |
|---|---|---|---|---|
| 10,164,640 | B1 * | 12/2018 | Lu | G11C 16/045 |
| 11,271,758 | B2 * | 3/2022 | Lee | G06F 21/71 |
| 2017/0126415 | A1 * | 5/2017 | Deyati | H04L 9/3278 |
| 2017/0180140 | A1 * | 6/2017 | Mai | H04L 9/3278 |

(Continued)

FOREIGN PATENT DOCUMENTS

| | | |
|---|---|---|
| KR | 10-2015-0117284 A | 10/2015 |
| KR | 10-2018-0125860 A | 11/2018 |

(Continued)

OTHER PUBLICATIONS

Korean Office Action dated Aug. 18, 2020 in counterpart Korean Patent Application No. 10-2019-0113761 (7 pages in Korean).

*Primary Examiner* — Ellen Tran
(74) *Attorney, Agent, or Firm* — NSIP Law

(57) ABSTRACT

The present disclosure provides a PUF circuit including a first array including at least one physically unclonable function (PUF) cell, a second array including at least one PUF cell, and a controller which selects a first PUF cell from the first array and selects a second PUF cell from the second array and generates unique information represented by the first PUF cell and the second PUF cell based on a first output voltage output by the first PUF cell and a second output voltage output by the second PUF cell.

14 Claims, 7 Drawing Sheets

(56) References Cited

U.S. PATENT DOCUMENTS

2018/0091293 A1   3/2018  Suresh et al.
2018/0159685 A1*  6/2018  Kwak .................... H04L 9/0866
2019/0253266 A1*  8/2019  Lee ....................... H04L 9/3278

FOREIGN PATENT DOCUMENTS

KR    10-2019-0069691 A   6/2019
KR         101989149 B1   6/2019

* cited by examiner

[FIG. 1]
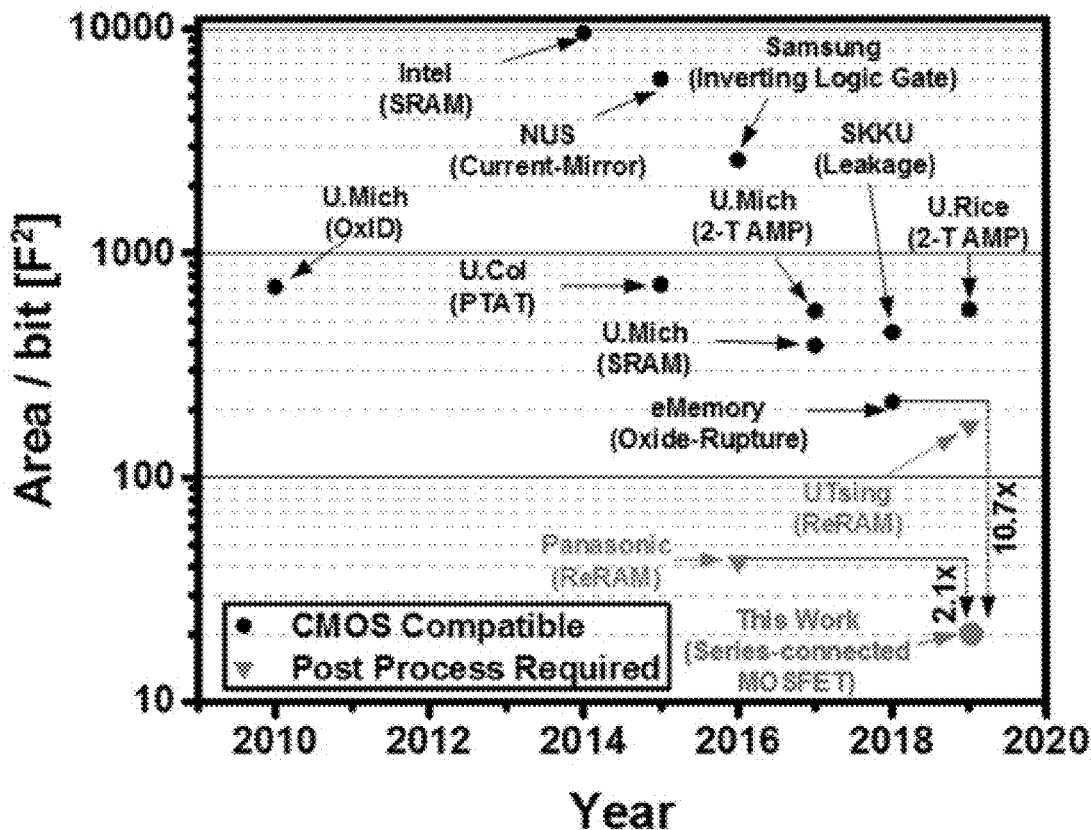
[FIG. 2]
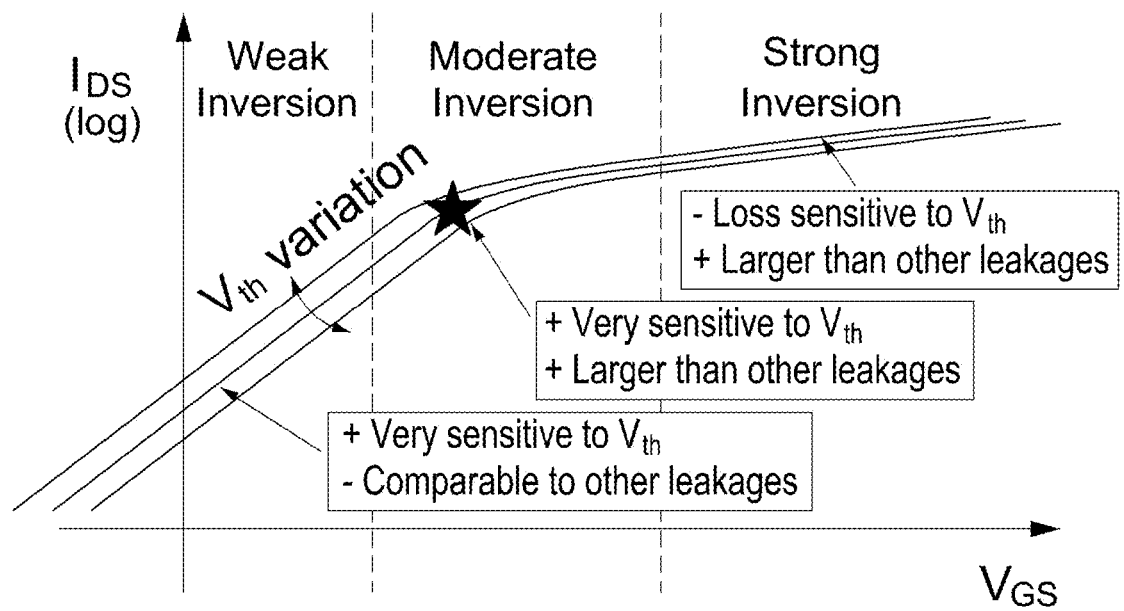

[FIG. 3]
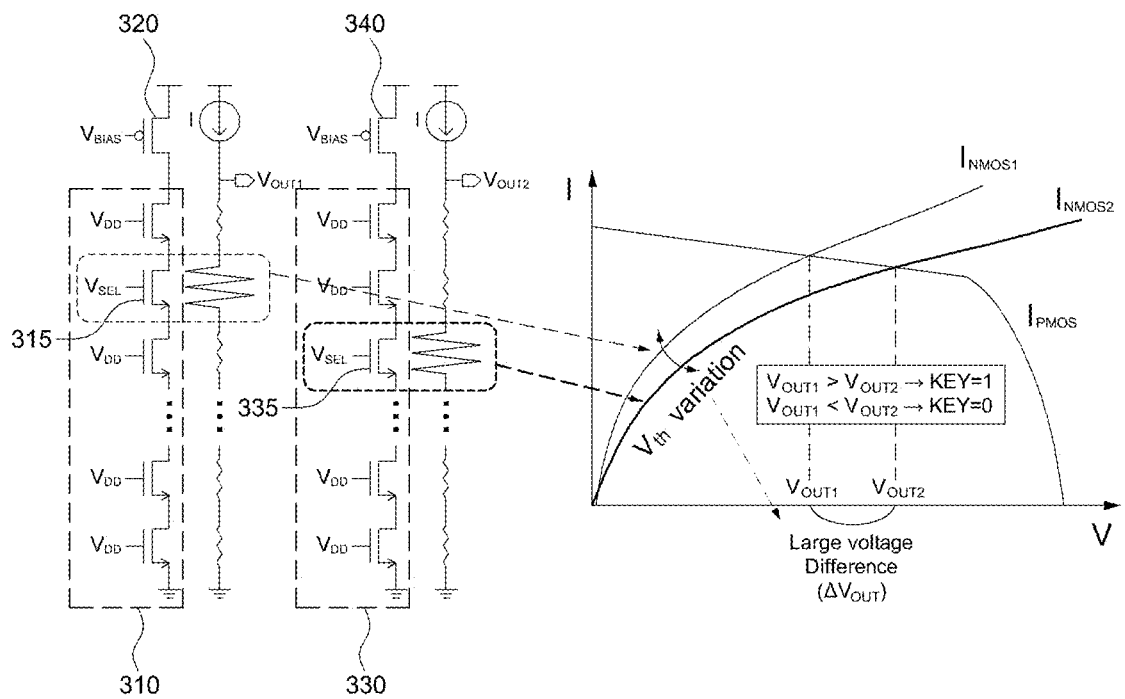
[FIG. 4]
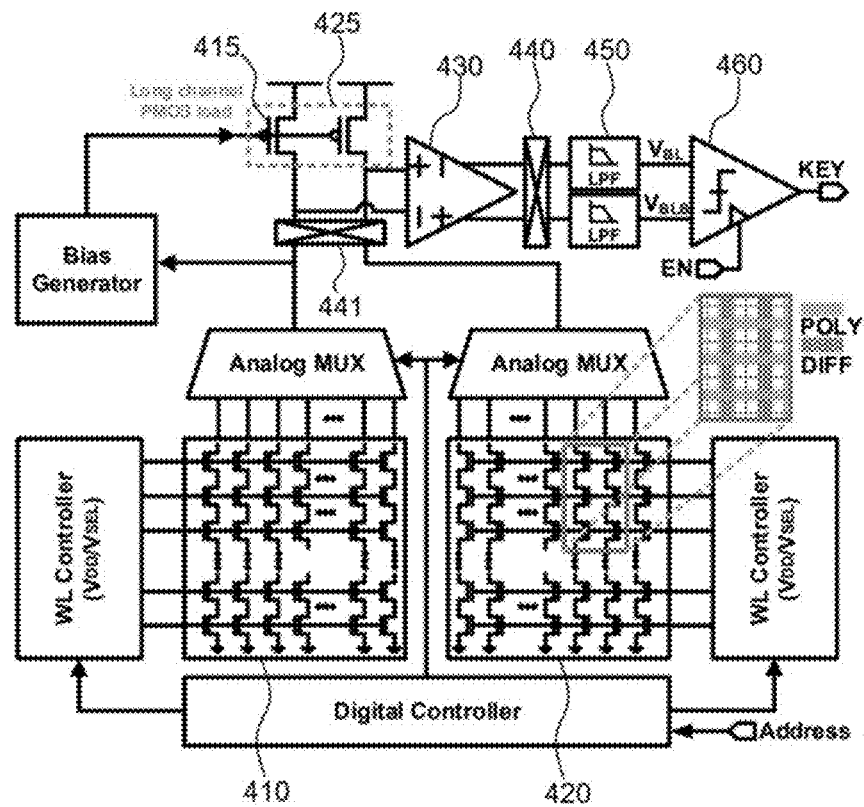

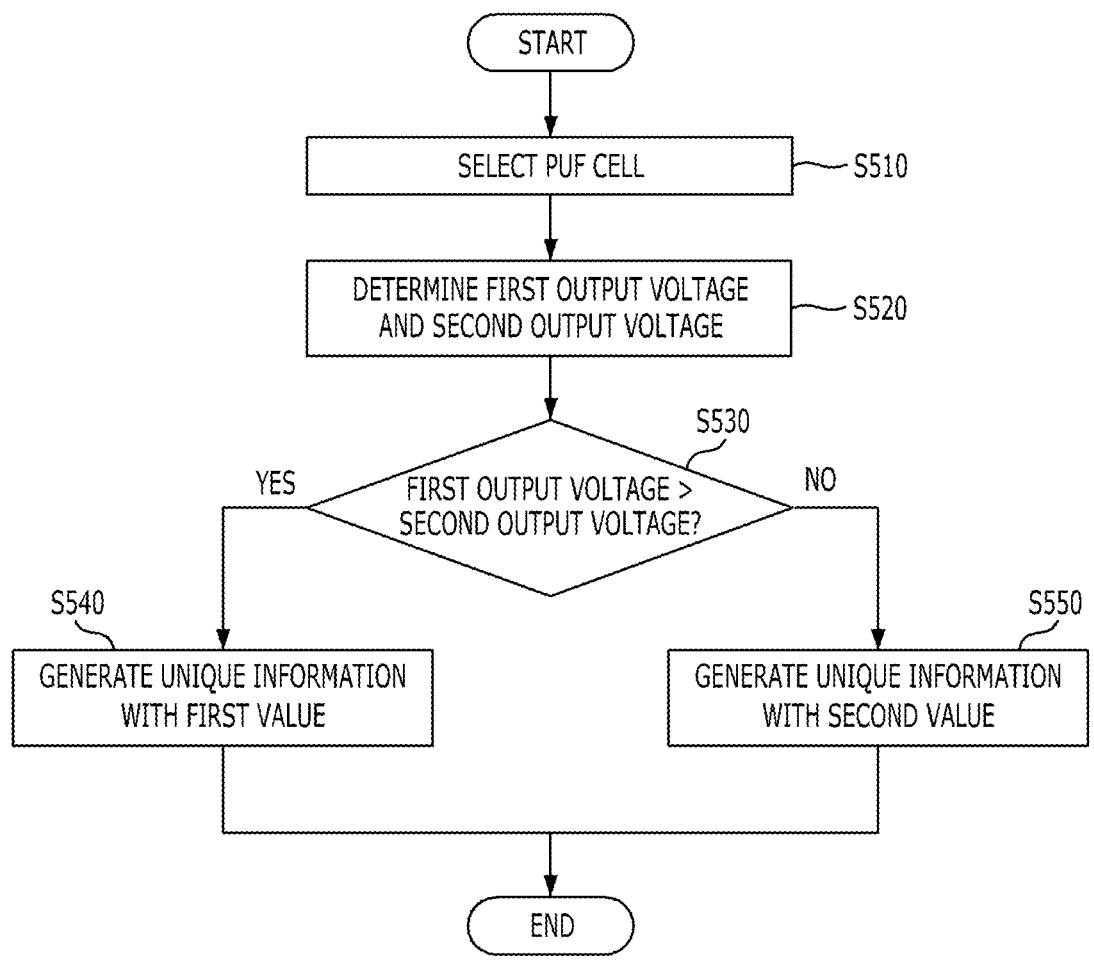

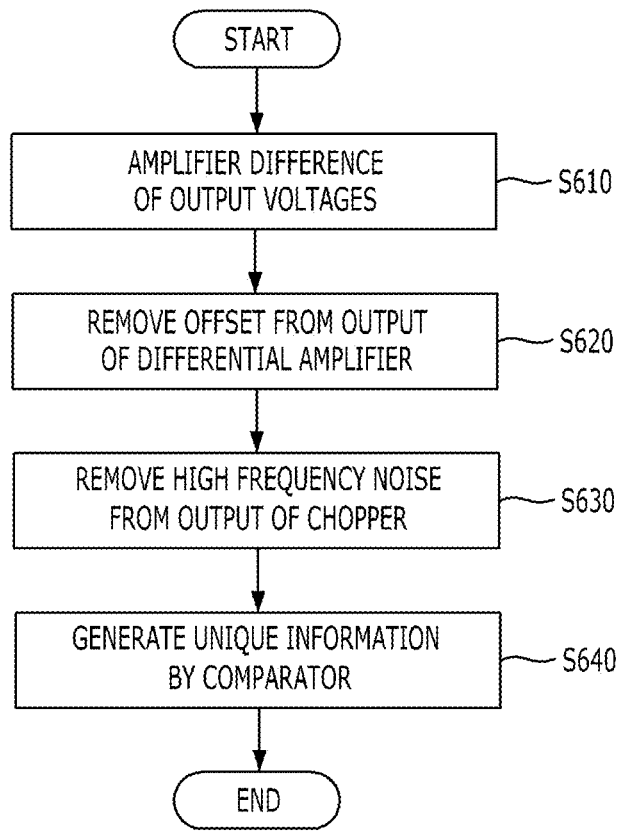
[FIG. 6]
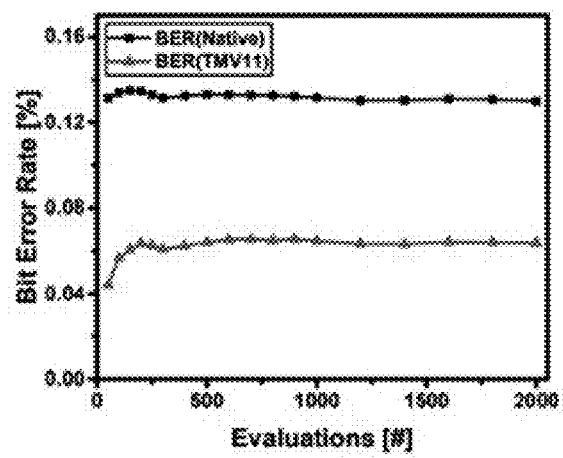
[FIG. 7A]

[FIG. 7B]
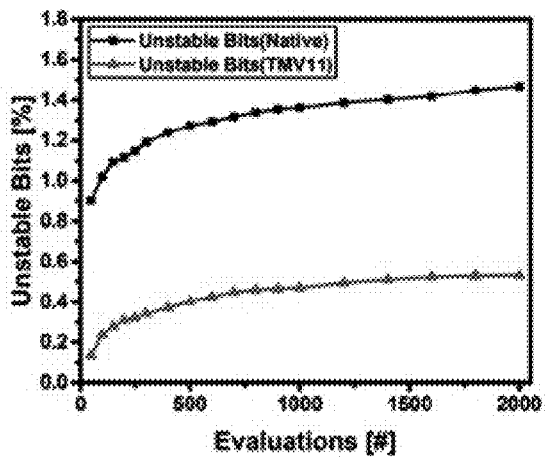
[FIG. 7C]
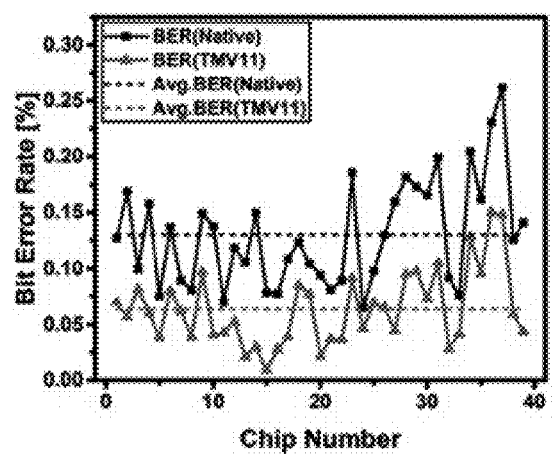
[FIG. 7D]
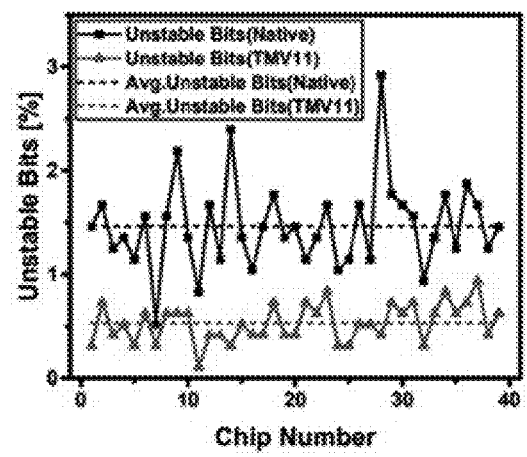

[FIG. 8A]
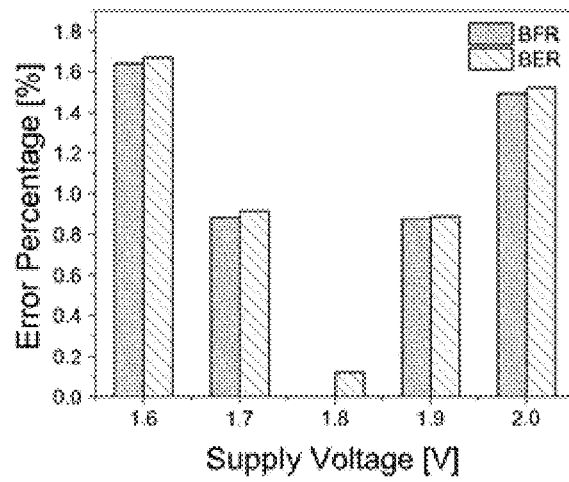
[FIG. 8B]
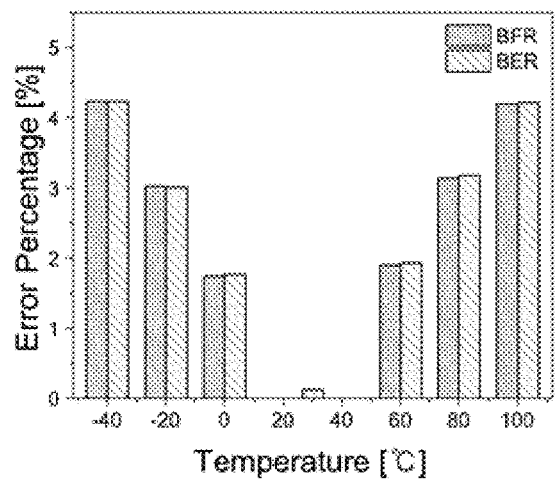

[FIG. 9A]
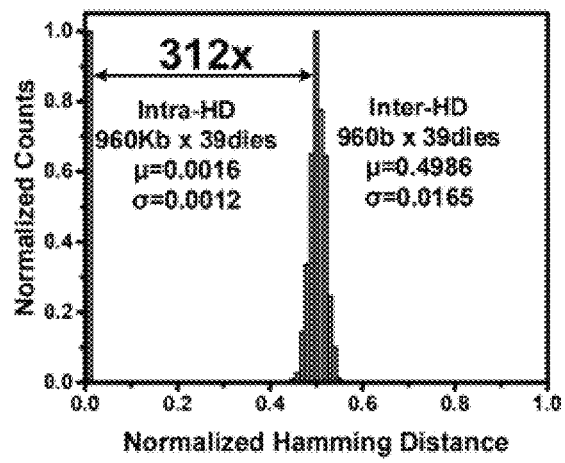
[FIG. 9B]
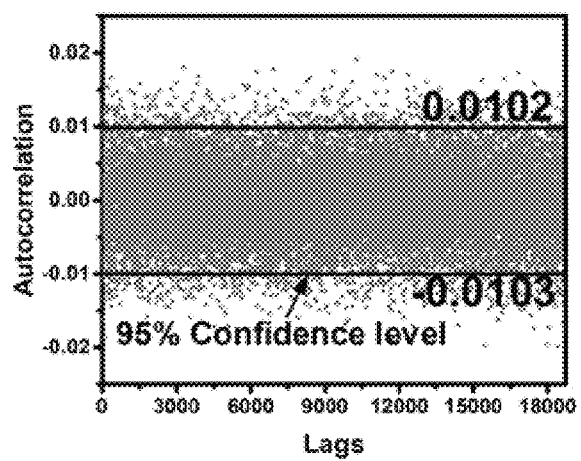

CIRCUIT FOR PHYSICALLY UNCLONABLE FUNCTION AND A METHOD TO GENERATE PRIVATE KEY FOR SECURE AUTHENTICATION USING A PHYSICALLY UNCLONABLE FUNCTION CELL

CROSS-REFERENCE TO RELATED APPLICATIONS

This application claims the priority of Korean Patent Application No. 10-2019-0113761 filed on Sep. 16, 2019, in the Korean Intellectual Property Office, the disclosure of which is incorporated herein by reference.

BACKGROUND

Field

The present disclosure relates to a PUF circuit for security and a method of generating a private key for user authentication using a PUF cell.

Description of the Related Art

Generally, when a plurality of hardware devices is manufactured, an error which is out of the control of a designer may occur due to various factors. For example, even though two chips are manufactured on the same silicon wafer, an error of several nanometers or more occurs in an electrical path designed by the same way and a difference between physical parameters is caused by a physical characteristic difference (for example, a difference in a doping concentration) of a transistor. The difference of the physical parameters cannot be controlled and each physical device has a unique characteristic so that it is used to identify a hardware device.

A security method which uses a difference in physical parameters of hardware as identification information is referred to as a physical unclonable function (hereinafter, abbreviated as "PUF") and studies to identify hardware devices using the PUF or use the PUF for security are being actively conducted.

Generally, when a plurality of transistors is manufactured on a silicon wafer, errors which are not intended by the designer may occur due to various factors. There may be several reasons for such errors. For example, an error may occur due to a change in the doping concentration on the wafer or an error may occur due to a physical size variation generated during a lithography process when a transistor is manufactured.

The above-mentioned errors cannot be controlled and each transistor may have different physical characteristic. Further, the difference in the physical characteristic follows a Poisson distribution and has randomness. Accordingly, unique information required to authenticate a user may be generated using transistors having unique characteristics generated through the randomness.

SUMMARY

The present disclosure provides a PUF circuit which is capable of generating a private key for user authentication for security while occupying a less area and a method of generating unique information of the PUF circuit.

According to an aspect of the present disclosure, a PUF circuit includes a first array including at least one physically unclonable function (PUF) cell; a second array including at least one PUF cell; and a controller which selects a first PUF cell from the first array and selects a second PUF cell from the second array and generates unique information represented by the first PUF cell and the second PUF cell based on a first output voltage output by the first PUF cell and a second output voltage output by the second PUF cell.

According to an exemplary embodiment, in the first PUF cell and the second PUF cell, a plurality of second type transistors is connected in series, and the first output voltage may be generated from a circuit in which one first type transistor and the first PUF cell are connected in series and the second output voltage is generated from a circuit in which another one first type transistor and the second PUF cell are connected in series.

According to an exemplary embodiment, the controller applies a first voltage to one transistor among the second type transistors to operate the one transistor in a moderate inversion area and applies a second voltage to transistors other than the transistor applied with the first voltage among the second type transistors to turn on the transistors, in each of the first PUF cell and the second PUF cell.

According to an exemplary embodiment, when the first output voltage exceeds the second output voltage, the controller generates the unique information with a first value and when the first output voltage is equal to or lower than the second output voltage, generates the unique information with a second value.

According to an exemplary embodiment, the first array and the second array include a plurality of PUF cells and gate terminals of transistors in each PUF cell which configures the first array corresponding to the same line on the series connection are electrically connected to each other and gate terminals of transistors in each PUF cell which configures the second array corresponding to the same line on the series connection are electrically connected to each other.

According to an exemplary embodiment, a channel length of the first type transistor is longer than a channel width of the first type transistor and the channel length of the first type transistor is longer than a channel length of the second type transistor.

According to an exemplary embodiment, the PUF circuit may further include a differential amplifier which receives the first output voltage and the second output voltage to amplify a difference between the first output voltage and the second output voltage; a chopper which is electrically connected to an output terminal of the differential amplifier and removes an offset generated by the differential amplifier and mismatch between two first type transistors; a low band pass filter which is electrically connected to an output terminal of the chopper and removes a high frequency noise generated by the chopper; and a comparator which is electrically connected to an output terminal of the low band pass filter and determines the unique information based on a voltage difference output by the low band pass filter.

According to an exemplary embodiment, the controller inputs the first output voltage and the second output voltage to the differential amplifier to amplify a voltage difference between the first output voltage and the second output voltage, inputs an output of the differential amplifier to the chopper to remove an offset generated in an output of the differential amplify, inputs an output of the chopper to the low band pass filter to remove a high frequency noise generated by the chopper, and inputs an output of the low band pass filter to the comparator to generate digitized unique information.

According to another aspect of the present disclosure, a PUF cell unique information generating method of generating unique information from a first array including at least one physically unclonable function (PUF) cell and a second array including at least one PUF cell includes: selecting a first PUF cell from the first array and a second PUF cell from the second array; determining a first output voltage which is an output voltage of the first PUF array and a second output voltage which is an output voltage of the second PUF array, generating unique information represented by the first PUF cell and the second PUF cell based on the difference between the first output voltage and the second output voltage.

According to an exemplary embodiment of the present disclosure, in the first PUF cell and the second PUF cell from the arrays, a plurality of second type transistors is connected in series, and the PUF cell unique information generating method further includes: applying a first voltage to one transistor of the second type transistors to operate the one transistor in a moderate inversion area, in each of the first PUF cell and the second PUF cell; and applying a second voltage to transistors of the second type transistors other than the transistor applied with the first voltage, in each of the first PUF array and the second PUF array, to turn on the transistors.

According to an exemplary embodiment of the present disclosure, The PUF cell unique information generating method may further include: generating the unique information with a first value when the first output voltage exceeds the second output voltage; and generating the unique information with a second value when the first output voltage is equal to or lower than the second output voltage.

According to an exemplary embodiment of the present disclosure, the generating of the unique information includes, amplifying a difference between the first output voltage and the second output voltage by inputting the first output voltage and the second output voltage to a differential amplifier; removing an offset from an output of the differential amplifier by inputting an output of the differential amplifier to a chopper; removing a high frequency noise generated by the chopper by inputting an output of the chopper to a low band pass filter; and generating digitized unique information by inputting an output of the low band pass filter to a comparator.

According to an exemplary embodiment disclosed in the present disclosure, an area in the device occupied by the PUF cell is reduced so that a cost efficiency of the PUF circuit may be improved. Further, according to an exemplary embodiment disclosed in the present disclosure, unique information having randomness is generated using a pair of PUF cells so that even though there is a change in a process of a device including a PUF cell, the change may not affect the randomness.

BRIEF DESCRIPTION OF DRAWINGS

The above and other aspects, features and other advantages of the present disclosure will be more clearly understood from the following detailed description taken in conjunction with the accompanying drawings, in which:

FIG. 1 is a graph illustrating a change in an area per bit of a physical unclonable function by year;

FIG. 2 is a graph illustrating a current characteristic of a MOSFET according to $V_{GS}$;

FIG. 3 is a view illustrating circuits of a first PUF cell and a second PUF cell according to an exemplary embodiment of the present disclosure and a voltage-current characteristic when a first PUF cell and a second PUF cell are selected from a first array and a second array;

FIG. 4 is a view illustrating a PUF circuit according to an exemplary embodiment of the present disclosure;

FIG. 5 is a flowchart of a PUF cell unique information generating method according to an exemplary embodiment of the present disclosure;

FIG. 6 is a flowchart specifically illustrating a unique information generating method according to an exemplary embodiment of the present disclosure;

FIG. 7A to 7D are graphs illustrating a bit error rate and an unstable cell characteristic of a PUF according to an exemplary embodiment of the present disclosure;

FIGS. 8A and 8B are graphs illustrating a bit error rate and a bit change rate according to a temperature and a voltage of a PUF according to an exemplary embodiment of the present disclosure; and FIGS. 9A and 9B are graphs illustrating randomness of a PUF according to an exemplary embodiment of the present disclosure.

DETAILED DESCRIPTION OF THE EMBODIMENT

Those skilled in the art may make various modifications to the present invention and the present invention may have various embodiments thereof, and thus specific embodiments will be described in detail with reference to the drawings. However, it should be understood that the present disclosure is not limited to the specific embodiments, but includes all changes, equivalents, or alternatives which are included in the spirit and technical scope of the present invention. In the description of respective drawings, similar reference numerals designate similar elements.

Terms such as first, second, A, or B may be used to describe various components but the components are not limited by the above terms. The above terms are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

Terms used in the present application are used only to describe a specific exemplary embodiment, but are not intended to limit the present invention. A singular form may include a plural form if there is no clearly opposite meaning in the context. In the present application, it should be understood that term "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

In the specification and the claim, unless explicitly described to the contrary, the word "comprise" and variations such as "comprises" or "comprising", will be understood to imply the inclusion of stated elements but not the exclusion of any other elements.

FIG. 1 is a graph illustrating a change in area per bit of a physical unclonable function by year.

It is confirmed from FIG. 1 that the size of the PUF cell is gradually reduced as years pass. A size of the PUF cell designed in the early 2010s was 700 $F^2$ or larger. Here, F denotes a feature size. For example, in a 7-nm process, F is 7 nm.

Accordingly, in order to save the cost caused by the large area per cell, studies are being conducted to gradually reduce the cell. According to an effort to reduce the area, a PUF manufactured in 2018 has an area per cell of approximately 200 $F^2$. In the meantime, as another method for reducing an area, there was a case that the area per cell of 40 $F^2$ was achieved using ReRAM. However, in order to manufacture the ReRAM, an additional process is necessary so that according to the method, there is a problem in that a cost and a time consumed to generate the PUF cell are significantly increased.

FIG. 2 is a graph illustrating a current characteristic of a MOSFET according to $V_{GS}$.

Generally, a relationship between $V_{GS}$ which is a voltage between a gate terminal and a source terminal of the MOSFET and $I_{DS}$ which is a current flowing from the drain terminal to the source terminal is illustrated in the graph of FIG. 2. According to an exemplary embodiment, when the PUF cell is selected, a PUF circuit may be designed at a low power by operating a MOSFET in the cell in a moderate inversion area. According to various exemplary embodiments, when the PUF cell is selected, the MOSFET in the cell operates at a voltage higher than in a weak inversion area so that an effect that the randomness is lowered due to an unintended leakage current may be reduced.

FIG. 3 is a view illustrating circuits of a first PUF cell and a second PUF cell according to an exemplary embodiment of the present disclosure and a voltage-current characteristic of the first PUF cell and the second PUF cell.

According to an exemplary embodiment, the PUF circuit includes a first array including at least one PUF cell, a second array including at least one PUF cell, and a controller which selects a first PUF cell from the first array and selects a second PUF cell from the second array and generates unique information represented by the first PUF cell and the second PUF cell based on a first output voltage output by the first PUF cell and a second output voltage output by the second PUF cell. According to various exemplary embodiments, in the first PUF cell and the second PUF cell, one first type transistor and a plurality of second type transistors are connected in series.

According to an exemplary embodiment, a first PMOS (p-channel metal oxide semiconductor) 320 and a first NMOS (n-channel oxide semiconductor) group 310 in which a plurality of NMOS is connected in series are connected in series to generate the first output voltage. According to various exemplary embodiments, a second PMOS 340 and a second NMOS group 330 in which a plurality of NMOS is connected in series are connected in series to generate the second output voltage.

According to an exemplary embodiment, with respect to one line of serially connected second type transistor lines selected from the first PUF array and one line of serially connected second type transistors selected from the second PUF array, the controller applies a first voltage to one transistor of the second type transistors to operate the one transistor in a moderate inversion area and applies a second voltage to transistors other than the transistor applied with the first voltage, among the second type transistors, to turn on the transistors.

That is, the controller may apply a first voltage $V_{SEL}$ which is lower than a threshold voltage of the MOSFET to a gate terminal of the first NMOS 315 of the first NMOS group 310 and the controller may apply a second voltage $V_{DD}$ to gate terminals of the remaining NMOS of the first NMOS group 310 excluding the first NMOS 315. In the meantime, a bias voltage $V_{BIAS}$ may be applied to a gate terminal of a first PMOS 320.

According to an exemplary embodiment, when the bias voltage is applied to the gate terminal of the first PMOS 320, the first PMOS 320 is considered as a current source. According to various exemplary embodiments, when the first voltage is applied to the gate terminal of the first NMOS 315, the first NMOS 315 is considered as an impedance with a specific impedance value. In the meantime, the second voltage is applied to the gate terminals of the NMOS of the first NMOS group 310 excluding the first NMOS 315 so that the NMOS excluding the first NMOS 315 are considered as short circuits. (In particular, the NMOS excluding the first NMOS have a predetermined level of impedance value, but the impedance value of the NMOS excluding the first NMOS are much lower than the impedance value of the first NMOS).

That is, an equivalent circuit of the first NMOS group 310 and the first PMOS 320 is illustrated as illustrated in FIG. 3 and thus, an output voltage $V_{OUT1}$ generated from the first PUF cell may be determined based on a current value of the current source and an impedance value of the first NMOS.

According to an exemplary embodiment, the controller may apply a first voltage $V_{SEL}$ which is lower than a threshold voltage of the MOSFET to a gate terminal of a second NMOS 335 of the second NMOS group 330 and the controller may apply a second voltage $V_{DD}$ to gate terminals of the remaining NMOS of the second NMOS group 330 excluding the second NMOS 335. In the meantime, a bias voltage $V_{BIAS}$ may be applied to a gate terminal of a second PMOS 340.

According to an exemplary embodiment, when the bias voltage is applied to the gate terminal of the second PMOS 340, the second PMOS 340 is considered as a current source. According to various exemplary embodiments, when the first voltage is applied to the gate terminal of the second NMOS 335, the second NMOS 335 is considered as an impedance with a specific impedance value. In the meantime, the second voltage is applied to the gate terminals of the NMOS of the second NMOS group 330 excluding the second NMOS 335 so that the NMOS excluding the second NMOS 335 from the second NMOS group 330 are considered as a short circuit. (In particular, the NMOS excluding the second NMOS has a predetermined level of impedance value, but the impedance value of the NMOS excluding the second NMOS is much lower than the impedance value of the second NMOS).

That is, an equivalent circuit of the second NMOS group 330 and the second PMOS 340 is illustrated as illustrated in FIG. 3 and thus, an output voltage $V_{OUT2}$ of the second PUF cell may be determined based on a current value of the current source and an impedance value of the second NMOS.

According to an exemplary embodiment, the controller randomly selects a first NMOS 315 from the first PUF cell to apply a first voltage to a gate terminal of the first NMOS 315 and randomly selects a second NMOS 335 from the second PUF cell to apply a second voltage to a gate terminal of the second NMOS 335. According to various exemplary embodiments, the controller may generate unique information of the PUF cell based on an output voltage $V_{OUT1}$ of the randomly selected first PUF cell and an output voltage $V_{OUT2}$ of the randomly selected second PUF cell.

In the meantime, in FIG. 3, it is illustrated that one PMOS and a plurality of NMOS are connected in series as an exemplary embodiment. Accordingly, the scope of the present disclosure should not be limited to the exemplary embodiment illustrated in FIG. 3. For example, one PUF cell may be configured such that one NMOS and a plurality of PMOS are connected in series.

FIG. 4 is a view illustrating a PUF circuit according to an exemplary embodiment of the present disclosure.

According to an exemplary embodiment, the PUF circuit may include a first array 410 including at least one PUF (physically unclonable function) cell and a second array 420 including at least one PUF cell. According to various exemplary embodiments, the first array 410 includes a plurality of MOSFET stacks.

According to an exemplary embodiment, a plurality of MOSFETs which configures one MOSFET stack may be connected in series. According to various exemplary embodiments, in one array, a plurality of MOSFET stacks is configured as lines. That is, one array has N lines and one MOSFET stack is disposed in each line.

According to an exemplary embodiment, in each PUF cell (which may be equal or similar to the above-mentioned MOSFET stack) which configures the first array 410, gate terminals of transistors corresponding to the same line in the series connection are electrically connected to each other. Further, in each PUF cell which configures the second array 420, gate terminals of transistors corresponding to the same line in the series connection may be electrically connected to each other. According to various exemplary embodiments, gate terminals of the transistors which configure the first array 410 and the second array 420 may be supplied with a specific voltage (for example, the first voltage and the second voltage mentioned above) by a control block.

According to an exemplary embodiment, one PUF cell among the plurality of PUF cells included in the first array 410 may be selected by an analog mux and one PUF cell among the plurality of PUF cells included in the second array 420 may be selected by the analog mux. According to various exemplary embodiments, when the first array 410 and the second array 420 are configured as illustrated in FIG. 4, poly and diffusion of the first array 410 and the second array 420 are configured by lattice patterns which horizontally and vertically intersect so that an area occupied by the arrays may be reduced.

According to an exemplary embodiment, the PUF circuit may include a first PMOS 415 to deduct an output voltage of the first array 410 and a second PMOS 425 to deduct an output voltage of the second array 420. According to various exemplary embodiments, the first PMOS 415 and the second PMOS 425 may be supplied with voltage from a bias voltage generator to bias a MOSFET.

According to an exemplary embodiment, a channel length of the first PMOS 415 and the second PMOS 425 may be longer than a channel width of the first PMOS 415 and the second PMOS 425. According to various exemplary embodiments, a channel length of the first PMOS 415 and the second PMOS 425 may be longer than a channel length of an NMOS which configures the first array 410 or the second array 420.

According to an exemplary embodiment, the PUF circuit includes a differential amplifier 430 which receives a first output voltage output from the first array 410 and a second output voltage output from the second array 420 to amplify a difference between the first output voltage and the second output voltage, a choppers 440 and 441 which are electrically connected to an output terminal of the differential amplifier 430 and removes an offset generated by the differential amplifier 430 and an offset caused by the mismatch between the first PMOS 415 and the second PMOS 425, a low band pass filter 450 which is electrically connected to an output terminal of the chopper 440 and removes a high frequency noise generated by the chopper 440, and a comparator 460 which is electrically connected to an output terminal of the low band pass filter 450 and determines the unique information based on a voltage difference output by the low band pass filter 450.

FIG. 5 is a flowchart of a PUF cell unique information generating method according to an exemplary embodiment of the present disclosure. The flowchart illustrated in FIG. 5 may be performed by the PUF circuit illustrated in FIG. 4 or an electronic device including the PUF circuit.

According to an exemplary embodiment, the controller may select a first PUF cell in a first array and select a second PUF cell in a second array, by an operation S510. According to various exemplary embodiments, after the operation S510, the controller may determine a first output voltage which is an output voltage of the first PUF cell and a second output voltage which is an output voltage of the second PUF cell, by an operation S520. According to an exemplary embodiment, the first output voltage and the second output voltage may be determined by a voltage divider circuit which is separately provided.

According to an exemplary embodiment, in the first PUF cell and the second PUF cell, a plurality of second type transistors may be connected in series. According to various exemplary embodiments, in each of the second type transistor stack including the first PUF cell and the second type transistor stack including the second PUF cell, the controller applies a first voltage to the first PUF cell and the second PUF cell of the second type transistor to operate the PUF cell transistor in a moderate inversion area and applies a second voltage to turn on transistors of the PUF cell other than the PUF cell to which the first voltage is applied.

According to an exemplary embodiment, the controller may compare a magnitude of the first output voltage and a magnitude of the second output voltage, by an operation S530. Even though the first PUF cell and the second PUF cell are manufactured to have the same design, an output voltage of the first PUF cell and an output voltage of the second PUF cell may have an error with randomness due to a process error. Accordingly, the present disclosure provides a method of generating unique information for user authentication based on the error.

According to an exemplary embodiment, when it is determined that the first output voltage exceeds the second output voltage in the operation S530, the controller may generate unique information with a first value, by an operation S540. For example, the controller may determine KEY for authenticating a user by 1 which is a digital value.

According to an exemplary embodiment, when it is determined that the first output voltage is equal to or lower than the second output voltage in the operation S530, the controller may generate unique information with a second value, by an operation S550. For example, the controller may determine KEY for authenticating a user by 0 which is a digital value.

FIG. 6 is a flowchart specifically illustrating a unique information generating method according to an exemplary embodiment of the present disclosure. The flowchart illustrated in FIG. 6 may be performed by the PUF circuit illustrated in FIG. 4 or an electronic device including the PUF circuit.

According to an exemplary embodiment, the controller inputs the first output voltage output from the first array and the second output voltage output from the second array to the differential amplifier to amplify a difference between the first output voltage and the second output voltage, by an operation S610. According to various exemplary embodiments, an error value between the first output voltage and the second output voltage is caused by a process error so that it may be very small. Accordingly, the present disclosure provides a method of amplifying a difference between the first output voltage and the second output voltage using the differential amplifier.

According to an exemplary embodiment, the controller may remove an offset from the output of the differential amplifier using the chopper, by an operation S620. According to various exemplary embodiments, the controller controls two choppers to alternately use an existing connection state and an intersecting connection state to remove an offset generated from the differential amplifier.

According to an exemplary embodiment, the controller inputs an output of the chopper to the low band pass filter to remove a high frequency noise generated by the chopper, by an operation S630. According to various exemplary embodiments, the controller inputs an output of the low band pass filter to the comparator to generate digitized unique information, by an operation S640. Referring to the previous example, when the first output voltage exceeds the second output voltage, the controller may generate unique information with a value of 1 through the comparator and when the first output voltage is equal to or lower than the second output voltage, the controller may generate unique information with a value of 0 through the comparator, or vice versa.

FIG. 7A to 7D are graphs illustrating a bit error rate and an unstable cell characteristic of a PUF according to an exemplary embodiment of the present disclosure.

FIG. 7A to 7D are graphs for a result value obtained by repeatedly measuring approximately 2,000 times for 39 chips at a room temperature. As a repeatedly measured result, as illustrated in FIGS. 7A and 7B, it is confirmed that a native bit error rate is 0.13%. Further, it is confirmed that when temporal majority voting (TMV) which is a stabilization technique is applied, the bit error is reduced to 0.06%. Further, a ratio of native unstable cells (unstable bits) is 1.47% of the entire cells and it is confirmed that when a TMV is applied, the ratio is reduced to 0.53%. As a bit error rate extracted for every chip and a ratio of unstable cells, as illustrated in FIGS. 7C and 7D, it is confirmed that a maximum native BER is 0.26% and native unstable bits are approximately 3%.

FIGS. 8A and 8B are graphs illustrating a bit error rate and a bit change rate according to a temperature and a voltage of a PUF according to an exemplary embodiment of the present disclosure.

According to an exemplary embodiment, PUF needs to show the same result as the result at the room temperature without an error, according to changes of the temperature and the voltage. In FIG. 8A, it is confirmed that the result is different from a result at the room temperature, by approximately 1.6%, according to a voltage change of 0.2 V. Further, it is confirmed that the bit error rate is also approximately 1.7%.

FIG. 8B illustrates a result measured in accordance with a temperature measurement reference of an industrial standard. It is confirmed that a bit change rate and a bit error rate are 4% at approximately −40° C. and 100° C.

FIGS. 9A and 9B are graphs illustrating randomness of a PUF according to an exemplary embodiment of the present disclosure.

According to an exemplary embodiment, in the PUF circuit, the randomness may be a measure of a strength of security. Referring to the graph of FIGS. 9A and 9B, it is confirmed that even though the measurement is repeated several times in the same chip, the same level of randomness is obtained.

According to an exemplary embodiment, it is confirmed that the probability that difference values are obtained in accordance to the repetition is approximately 0.0016 which is very low. It is further confirmed that even though the measurement is repeated several times in the same chip through inter hamming distance values measured between different chips, the same result value is obtained. In the meantime, an intra hamming distance value measured between different chips is 0.4986 and it is confirmed that a probability that a cell-pair in the same position generates the same value is close to 0.5. That is, it is confirmed through the above result that the value is randomly generated in the PUF which generates "0" or "1".

As a result of an autocorrelation function which is another measure representing randomness, as illustrated in FIG. 9, 95% confidence level is approximately 0.01. This means that there is no correlation between difference cell-pairs in the same chip.

It will be appreciated that various exemplary embodiments of the present invention have been described herein for purposes of illustration, and that various modifications, changes, and substitutions may be made by those skilled in the art without departing from the scope and spirit of the present invention. Accordingly, the exemplary embodiments disclosed herein are intended to not limit but describe the technical spirit of the present invention and the scope of the technical spirit of the present invention is not restricted by the exemplary embodiments. The protective scope of the present disclosure should be construed based on the following claims, and all the technical concepts in the equivalent scope thereof should be construed as falling within the scope of the present disclosure.

What is claimed is:

1. A PUF circuit, comprising:
a first array including at least one physically unclonable function (PUF) cell;
a second array including at least one PUF cell;
a controller which selects a first PUF cell from the first array and selects a second PUF cell from the second array and generates unique information represented by the first PUF cell and the second PUF cell based on a first output voltage output by the first PUF cell and a second output voltage output by the second PUF cell;

a differential amplifier which receives the first output voltage and the second output voltage to amplify a difference between the first output voltage and the second output voltage;

a chopper which is electrically connected to an output terminal of the differential amplifier and removes an offset generated by the differential amplifier and mismatch between two first type transistors; and a low band pass filter which is electrically connected to an output terminal of the chopper and removes a high frequency noise generated by the chopper.

2. The PUF circuit according to claim 1, wherein in the first PUF cell and the second PUF cell, a plurality of second type transistors is connected in series, and the first output voltage is generated from a circuit in which one first type transistor and the first PUF cell are connected in series and the second output voltage is generated from a circuit in which another one first type transistor and the second PUF cell are connected in a series connection.

3. The PUF circuit according to claim 2, wherein the controller applies a first voltage to one transistor among the second type transistors to operate the one transistor in a moderate inversion area and applies a second voltage to transistors other than the transistor applied with the first voltage, among the second type transistors, to turn on the transistors, in each of the first PUF cell and the second PUF cell.

4. The PUF circuit according to claim 1, wherein when the first output voltage exceeds the second output voltage, the controller generates the unique information with a first value and when the first output voltage is equal to or lower than the second output voltage, generates the unique information with a second value.

5. The PUF circuit according to claim 2, wherein the first array and the second array include a plurality of PUF cells and gate terminals of transistors in each PUF cell which configures the first array corresponding to a same line on the series connection are electrically connected to each other and gate terminals of transistors in each PUF cell which configures the second array corresponding to the same line on the series connection are electrically connected to each other.

6. The PUF circuit according to claim 2, wherein a channel length of the first type transistor is longer than a channel width of the first type transistor and the channel length of the first type transistor is longer than a channel length of the second type transistors.

7. The PUF circuit according to claim 1, further comprising a comparator which is electrically connected to an output terminal of the low band pass filter and determines the unique information based on a voltage difference output by the low band pass filter.

8. The PUF circuit according to claim 1, wherein the controller inputs the first output voltage and the second output voltage to the differential amplifier to amplify a voltage difference between the first output voltage and the second output voltage, inputs an output of the differential amplifier to the chopper to remove an offset generated in an output of the differential amplify, inputs an output of the chopper to the low band pass filter to remove a high frequency noise generated by the chopper, and inputs an output of the low band pass filter to the comparator to generate digitized unique information.

9. The PUF circuit according to claim 1, wherein the first array and the second array are arranged in a poly and diffusion lattice pattern.

10. A PUF cell unique information generating method of generating unique information from a first array including at least one physically unclonable function (PUF) cell and a second array including at least one PUF cell, the method comprising:

selecting a first PUF cell from the first array and a second PUF cell from the second array;

determining a first output voltage generated by the first PUF cell and a second output voltage generated by the second PUF cell;

generating unique information represented by the first PUF cell and the second PUF cell based on a difference between the first output voltage and the second output voltage, wherein the generating of the unique information includes:

amplifying a difference between the first output voltage and the second output voltage by inputting the first output voltage and the second output voltage to a differential amplifier; and removing an offset from an output of the differential amplifier by inputting an output of the differential amplifier to a chopper.

11. The PUF cell unique information generating method according to claim 10, wherein the first array and the second array are arranged in a poly and diffusion lattice pattern.

12. The PUF cell unique information generating method according to claim 10, wherein in the first PUF cell and the second PUF cell, a plurality of second type transistors is connected in series, and further comprising applying a first voltage to one transistor of the second type transistors to operate the one transistor in a moderate inversion area, in each of the first PUF cell and the second PUF cell; and applying a second voltage to transistors of the second type transistors other than the transistor applied with the first voltage to turn on the transistors, in each of the first array and the second array.

13. The PUF cell unique information generating method according to claim 10, further comprising:

generating the unique information with a first value when the first output voltage exceeds the second output voltage; and generating the unique information with a second value when the first output voltage is equal to or lower than the second output voltage.

14. The PUF cell unique information generating method according to claim 10, wherein the generating of the unique information further includes:

removing a high frequency noise generated by the chopper by inputting an output of the chopper to a low band pass filter; and generating digitized unique information by inputting an output of the low band pass filter to a comparator.

* * * * *